(12) United States Patent
Bahadur et al.

(10) Patent No.: US 9,537,756 B2
(45) Date of Patent: Jan. 3, 2017

(54) METHOD FOR SYNCHRONIZED BGP AND VRRP FAILOVER OF A NETWORK DEVICE IN A NETWORK

(71) Applicant: Check Point Software Technologies Ltd., Tel-Aviv (IL)

(72) Inventors: Rahul Bahadur, San Mateo, CA (US); Tuyen Nguyen, San Ramon, CA (US)

(73) Assignee: CHECK POINT SOFTWARE TECHNOLOGIES LTD, Tel-Aviv (IL)

( * ) Notice: Subject to any disclaimer, the term of this patent is extended or adjusted under 35 U.S.C. 154(b) by 85 days.

(21) Appl. No.: 13/913,537

(22) Filed: Jun. 10, 2013

(65) Prior Publication Data

US 2014/0362681 A1    Dec. 11, 2014

(51) Int. Cl.
| | |
|---|---|
| H04L 12/26 | (2006.01) |
| H04L 12/28 | (2006.01) |
| H04L 12/16 | (2006.01) |
| H04L 12/707 | (2013.01) |

(52) U.S. Cl.
CPC ..................... *H04L 45/22* (2013.01)

(58) Field of Classification Search
CPC ......... H04W 40/00; H04L 69/40; H04L 69/14; H04L 29/06; H04L 45/28; H04L 45/00
USPC ................................. 370/252, 254
See application file for complete search history.

(56) References Cited

U.S. PATENT DOCUMENTS

| | | | | |
|---|---|---|---|---|
| 7,710,865 B2 * | 5/2010 | Naseh | ...................... | H04L 45/04 370/221 |
| 8,094,569 B2 * | 1/2012 | Gunukula | ................. | H04J 3/14 370/242 |
| 2004/0042396 A1 * | 3/2004 | Brown | ..................... | H04L 29/06 370/227 |
| 2004/0257983 A1 * | 12/2004 | Kopp | ....................... | H04L 45/00 370/217 |
| 2006/0165009 A1 * | 7/2006 | Nguyen | .............. | H04L 12/2854 370/252 |
| 2006/0198298 A1 * | 9/2006 | Bhogavilli | .............. | H04L 45/00 370/229 |
| 2010/0142543 A1 * | 6/2010 | Shaikh | .................... | H04L 45/04 370/401 |

OTHER PUBLICATIONS

Nadas, S., Ed., "Virtual Router Redundancy Protocol (VRRP) Version 3 for IPv4 and IPv6", RFC 5798 (http://datatracker.ietf.org/doc/rfc5798), Mar. 2010.
Rekhter, Y., et al, Eds., "A Border Gateway Protocol 4 (BGP-4)", RFC 4271 (http://datatracker.ietf.org/doc/rfc4271), Jan. 2006.

* cited by examiner

*Primary Examiner* — Christine Duong
*Assistant Examiner* — Abdelillah Elmejjarmi
(74) *Attorney, Agent, or Firm* — Mark M. Friedman

(57) ABSTRACT

A network device which communicates with peers using Border Gateway Protocol (BGP) advertises to one or more peers a first Multi-Exit Discriminator (MED) when all sessions are in 'established' state, and a second MED when one or more sessions are in a non-'established' state. The second MED is higher than the first MED and higher than the MED advertised by the backup network device, causing peers to prefer the backup device. If the device is also configured for Virtual Router Redundancy Protocol (VRRP), when the device advertises the first MED, virtual routers are transitioned to 'master' state, and when the device advertises the second MED, virtual routers are transitioned to 'backup' state.

18 Claims, 8 Drawing Sheets

Fig. 1 – PRIOR ART

METHOD FOR SYNCHRONIZED BGP AND VRRP FAILOVER OF A NETWORK DEVICE IN A NETWORK

FIELD AND BACKGROUND OF THE INVENTION

The present invention relates to a method for configuring a network device, such as a router, which is configured for Border Gateway Protocol (BGP) to automatically cause route selection by a peer of the network device to failover from a route learned through a session with the network device to a route learned through a session with a backup network device in the event of a failure at the first network device, and more particularly, to a method for synchronized BGP and Virtual Router Redundancy Protocol (VRRP) failover when the network device also acts as one or more virtual routers in a VRRP network.

BGP is the protocol used to exchange route information between routers of Autonomous Systems (AS). See for example, Rekhter, Y., Li, T., and S. Hares, Eds., "A Border Gateway Protocol 4 (BGP-4)", RFC 4271 (http://datatracker.ietf.org/doc/rfc4271), Jan. 2006.

BGP routers in neighboring ASs (referred to herein as "peers") exchange route information with one another other in BGP sessions (henceforth "sessions"), whereby a router will advertise to its peers, via "UPDATE" messages, routes through which addresses within its AS are reachable. The receiving router stores the routes received from peers in the router's Route Information Database (RIB), which is then used by the router to determine the best route to any particular destination. A single BGP router may be simultaneously engaged in multiple sessions. Further, two or more BGP routers may be active in a single AS, providing the same or different routes to destinations within the AS. Often, these routers are configured for redundancy in a high availability deployment so that if the primary router fails, traffic will be routed through the alternate, or backup, router without incurring extra hops.

VRRP is a protocol used by physical routers that are clustered together to appear as virtual routers in which interfaces of the physical routers can be configured with the same virtual IP addresses which are shared by all routers in the cluster. See for example, Nadas, S., Ed., "Virtual Router Redundancy Protocol (VRRP) Version 3 for IPv4 and IPv6", RFC 5798 (http://datatracker.ietf.org/doc/rfc5798), Mar. 2010. Since each physical router has multiple interfaces, each interface can be configured for a different virtual router, therefore a physical router may have some interfaces configured to be master virtual routers and other interfaces configured to be backup virtual routers. As used herein, the term "virtual router" refers to an interface of a physical router which is configured to act as a virtual router using VRRP.

In a high availability router deployment, taking a physical router offline is a very expensive process, especially when the problem is of a temporary nature or only affects a single session. More desirable would be a failover method where traffic can be routed through the backup router temporarily until the problem with the master router is resolved, and automatically routed through the master again once the problem it was experiencing is resolved. There may also be cases where although there may be a problem with the master router, it is nevertheless desired that traffic should continue to be received by the master router from some peers while traffic from other peers is transferred to the backup router. Thus, selectivity is another desirable feature of a failover method wherein some, but not all, sessions can be selected to failover to the backup router if the primary router is experiencing a problem with one or more sessions. Furthermore, since a BGP router may also be a member of a VRRP cluster, it would be advantageous if, when a session on the primary router fails over to the backup router, the primary router would also automatically transition from a VRRP 'master' state to a 'backup' state until the problem is resolved. The reverse is also a true, in that if a virtual router on the primary router transitioned from a 'master' state into an 'init' state, selected BGP sessions should automatically also failover to the backup router. Such a failover method would ensure that a router which has a problem is not acting as master in either capacity.

SUMMARY OF THE INVENTION

The present invention describes a method for synchronized BGP and VRRP failover of network devices in a network, which can be used to selectively reroute BGP sessions from the primary router in a multi-router BGP implementation to the backup router. Although we use the term "router" throughout, it will be appreciated by one skilled in the art that the method disclosed herein is not limited to routers but is applicable to other types of network devices as well, and "router" should be understood to include any other type of network device to which the present invention could be applied.

The Multi-Exit Discriminator (MED) is an attribute advertised by a BGP router to its neighbors in an UPDATE message. The MED attribute describes the cost of the route advertised; the higher the MED, the more expensive the route. When two or more BOP routers advertise the same number of hops to a destination, often the route that is chosen is the one with the lower MED, although the peer may choose any other route as well.

According to the present invention there is provided a method for automatic failover of route selection by a Border Gateway Protocol (BOP) peer from a route learned through a session with a first network device to a route learned through a session with a second network device, including, by the first network device, (a) initially advertising to the peer a first Multi-Exit Discriminator (MED), and (b) subsequent to the initial advertising of the first MED to the peer, upon receiving a first signal and upon a first set of conditions being met, advertising to the peer a second MED. Preferably, the second MED is greater than both of the first MED and an MED advertised by the second network device to the peer. Preferably, the first signal includes an indication that a session has transitioned out of an 'established' state, and the first set of conditions is: the second MED is not currently being advertised. Preferably, the method further includes, by the first network device: (c) subsequent to the advertising of the second MED to the peer, and upon receiving a second signal and upon a second set of conditions being met: again advertising the first MED to the peer. Preferably, the second signal includes an indication that a session has transitioned into an 'established' state, and the second set of conditions is: all sessions are in an 'established' state.

Optionally, one or more Virtual Router Redundancy Protocol (VRRP) virtual routers may be configured on one or more interfaces of the first network device and the second network device. In that case the method preferably includes, by the first network device (i) when initially advertising the first MED: also signaling each of the one or more virtual routers to transition to a 'master' state, and (ii) subsequently when advertising the second MED: also signaling each of the one or more virtual routers to transition to a 'backup' state. Preferably the first signal includes an indication that either (i) a session transitioned out of an 'established' state, or (ii) a virtual router transitioned into an 'init' state, and the first set of conditions is: the second MED is not currently being advertised to a peer. Preferably the method further includes (d) subsequent to the advertising of the second MED to the peer, and upon receiving a second signal and upon a second set of conditions being met (i) again advertising the first MED to the peer, and (ii) signaling each of the one or more virtual routers to transition to a 'master' state. Preferably, the second signal includes an indication that either: (i) a session transitioned into an 'established' state, or (ii) a virtual router transitioned into a 'backup' state, and the second set of conditions is: each session is in an 'established' state, and none of the one or more virtual routers is in an 'Mit' state.

According to the present invention there is further provided a computer-readable storage medium having non-transient computer-readable code embodied on the computer-readable storage medium, the computer-readable code for causing route selection by a Border Gateway Protocol (BGP) peer to failover from a route received in a session with a first router to a route received in a session with a second router the computer-readable code including a set of instructions that, when executed on the first router, causes the first router to: (a) initially advertise, to the peer, a first Multi-Exit Discriminator (MED); and (b) subsequent to the initial advertising of the first MED to the peer: upon receiving a first signal and upon a first set of conditions being met: advertise to the peer a second MED. Preferably, the second MED is greater than both of the first MED and an MED advertised by the second router to the peer. Preferably, the first signal includes an indication that a session has transitioned out of an 'established' state, and the first set of conditions is: the second MED is not currently being advertised. Preferably, the computer-readable storage medium further includes instructions that, when executed on the first router, causes the first router to: (c) subsequent to the advertising of the second MED to the peer, and upon receiving a second signal and upon a second set of conditions being met: again advertise the first MED to the peer. Preferably, the second signal includes an indication that a session has transitioned into an 'established' state, and the second set of conditions: all sessions are in an 'established' state.

Optionally, if an interface of the first and second routers is configured as a Virtual Router Redundancy Protocol (VRRP) virtual router then the computer-readable storage medium may further include instructions that, when executed on the first router, causes the first router to: (i) when initially advertising the first MED: also signal the virtual router to transition to a 'master' state, and (ii) subsequently when advertising the second MED: also signal the virtual router to transition to a 'backup' state. Preferably, the first signal includes an indication that either: (i) a session transitioned out of an 'established' state, or (ii) a virtual router transitioned into an 'init' state, and the first set of conditions is: the second MED is not currently being advertised. Preferably, the computer-readable storage medium further includes instructions that, when executed on the first router, causes the first router to: (d) subsequent to the advertising of the second MED to the peer, and upon receiving a second signal and upon a second set of conditions being met: (i) again advertise the first MED to the peer, and (ii) signal the virtual router to transition to a 'master' state. Preferably, the second signal includes an indication that either: (i) a session transitioned into an 'established' state, or (ii) a virtual router transitioned into a 'backup' state, and the second set of conditions is: each session is in an 'established' state, and no virtual router is in an 'init' state.

According to the present invention there is further provided a network device including: (a) a monitoring module for monitoring a respective state of each of at least one Border Gateway Protocol (BGP) session; and (b) a Multi-Exit Discriminator (MED) module that: (i) initially advertises to a peer a first MED, (ii) upon receipt of a first signal from the monitoring module: if a first set of conditions is met: advertises to the peer a second MED, and (iii) upon receipt of a second signal from the monitoring module: if a second set of conditions is met: again advertises to the peer the first MED. Preferably, the second MED is greater than both of the first MED and an MED advertised by a backup network device to the peer. Preferably, the first signal includes an indication that a session transitioned out of an 'established' state, and the first set of conditions is: the second MED is not currently being advertised. Preferably, the second signal includes an indication that a session transitioned into an 'established' state, and the second set of conditions is: all sessions are in an 'established' state.

Optionally, the monitoring module of the network device may also monitor a respective state of each of at least one Virtual Router Redundancy Protocol (VRRP) virtual router, and the network device may further include: (c) a VRRP transition module for transitioning the state of a virtual router, in which case: when the MED module advertises the first MED, the VRRP transition module transitions each of the at least one virtual routers to a 'master' state, and when the MED module advertises the second MED, the VRRP transition module transitions each of the at least one virtual routers to a 'backup' state. Preferably, the first signal includes an indication that either: (i) a session transitioned out of an 'established' state, or (ii) a virtual router transitioned into an 'init' state, and the first set of conditions is: the second MED is not currently being advertised. Preferably, the second signal includes an indication that either: (i) a session transitioned into an 'established' state, or (ii) a virtual router transitioned into a 'backup' state, and the second set of conditions is: all sessions are in an 'established' state, and no virtual routers are in an 'init' state.

According to the present invention, a primary network device which is configured for BGP, such as a router, is configured to advertise, in sessions with peers, one of two possible MEDs. Initially, each session advertises a first MED. The first MEDs can be the same or different from one another. Each session continues to advertise its first MED so long as all sessions are in the 'established' state, i.e. the router is operating normally. If the router detects a previously 'established' session entering a non-'established' state, one or more sessions begin advertising the second MED. The second MED can be any number higher than both the first MED and the MED advertised by a backup router to the same peer. When sessions begin advertising the second MED, peers will automatically switch to routing through a backup router. The router can be configured so that either all sessions switch to advertising the second MED or only a subset of sessions switch to advertising the second MED, since in some cases it may be desirable for select peers to continue routing through the primary router. Henceforth we refer to a session configured to advertise the second MED as a "failover-configured session." Only failover-configured sessions will be "transferred" to the backup router, while sessions which are configured to remain advertising the first MED will not. In this way, selective failover is achieved.

When the non-'established' session becomes 'established' again, the failover-configured sessions resume advertising the first MED, which is lower than the corresponding MED advertised by the backup router. As a result, peers will resume preferring it over the more "expensive" backup.

The system of the present invention can also be used in conjunction with VRRP for those deployments where the BGP protocol on the routers act independent of VRRP by using interface IP addresses, not virtual IP addresses, for communications in the network and routing of Internet traffic. In that case, a failover in the BGP state should trigger a failover in the VRRP state and vice versa, so that failover is synchronized between both systems. In the context of VRRP, "failover" occurs when a master or primary router in the cluster signals that it should no longer act as the master router, in which case an alternate router is selected to take over the role as master.

DESCRIPTION OF THE PREFERRED EMBODIMENTS

The principles and operation of a method for synchronized BGP and VRRP will now be explained. Suppose that a destination in an autonomous system is reachable from three entry points to the autonomous system, those being R1, R2 and R3. Each of R1, R2 and R3 advertise route information to neighboring routers R4, R5 and R6. The example assumes that R1 is the primary router with R2 and R3 as backups. Even though R2 and R3 are backups, they are also configured to receive traffic concurrently with R1. R2 is configured to share traffic received from R4 and R6 equally with R1. R3 is configured to share traffic receive from R6 equally with R1 and R2. R1's sessions with R4 and R5 are failover-configured, while R1's session with R6 is not. Table 1 shows the likely routes chosen by R4, R5 and R6 when all routers are operating problem-free.

TABLE 1

No problems detected on R1

| Session No. | Route Advertised By | Route Advertised To | MED advertised | Likely routes that will be chosen by R4, R5 and R6 |
|---|---|---|---|---|
| 1* | R1 | R4 | 25 (first MED) | R1←R4, R5, R6 |
| 2* | R1 | R5 | 35 (first MED) | |
| 3 | R1 | R6 | 10 | |
| 4 | R2 | R4 | 25 | R2←R4, R6 |
| 5 | R2 | R5 | 40 | |
| 6 | R2 | R6 | 10 | |
| 7 | R3 | R4 | 75 | R3←R6 |
| 8 | R3 | R5 | 50 | |
| 9 | R3 | R6 | 10 | |

*indicates failover-configured session

Since R1 and R2 advertise to R4 an MED of 25, while R3 advertised an MED of 75, R4 will choose between R1 or R2 as the preferred route. On the other hand, R5 will always choose R1 (lowest MED=35) and R6 will choose between R1, R2 or R3 since MED=10 in all cases.

Now suppose a problem on R1 causes an 'established' session to become non-'established', and the sessions between R1-R4 and R1-R5 are failover-configured according to the present invention. Those sessions will begin to advertise the second MED. Table 2 shows the new routes likely to be chosen by R4, R5 and R6.

TABLE 2

Problem detected on R1

| Session No. | Route Advertised By | Route Advertised To | MED advertised | Likely routes that will be chosen by R4, R5 and R6 |
|---|---|---|---|---|
| 1* | R1 | R4 | 80 (second MED) | R1←R6 |
| 2* | R1 | R5 | 80 (second MED) | |
| 3 | R1 | R6 | 10 | |
| 4 | R2 | R4 | 25 | R2←R4, R5, R6 |
| 5 | R2 | R5 | 40 | |
| 6 | R2 | R6 | 10 | |
| 7 | R3 | R4 | 75 | R3←R6 |
| 8 | R3 | R5 | 50 | |
| 9 | R3 | R6 | 10 | |

*indicates failover-configured MED session

Since R1 advertises MED=80 to R4 and R5, those routers no longer choose R1 as the preferred route, opting instead to route traffic through R2. R6 may continue to route through either R1, R2 or R3 since MED=10 in all cases. Thus, traffic from R4 and R5 to R1 always failover to R2, while R1 may continue to receive traffic from R6. When the problem with R1 is resolved, and all sessions are 'established', R1 reverts to advertising its first MEDs as in Table 1 and traffic from R4 and R5 may now be routed through R1 again.

Figure 1:
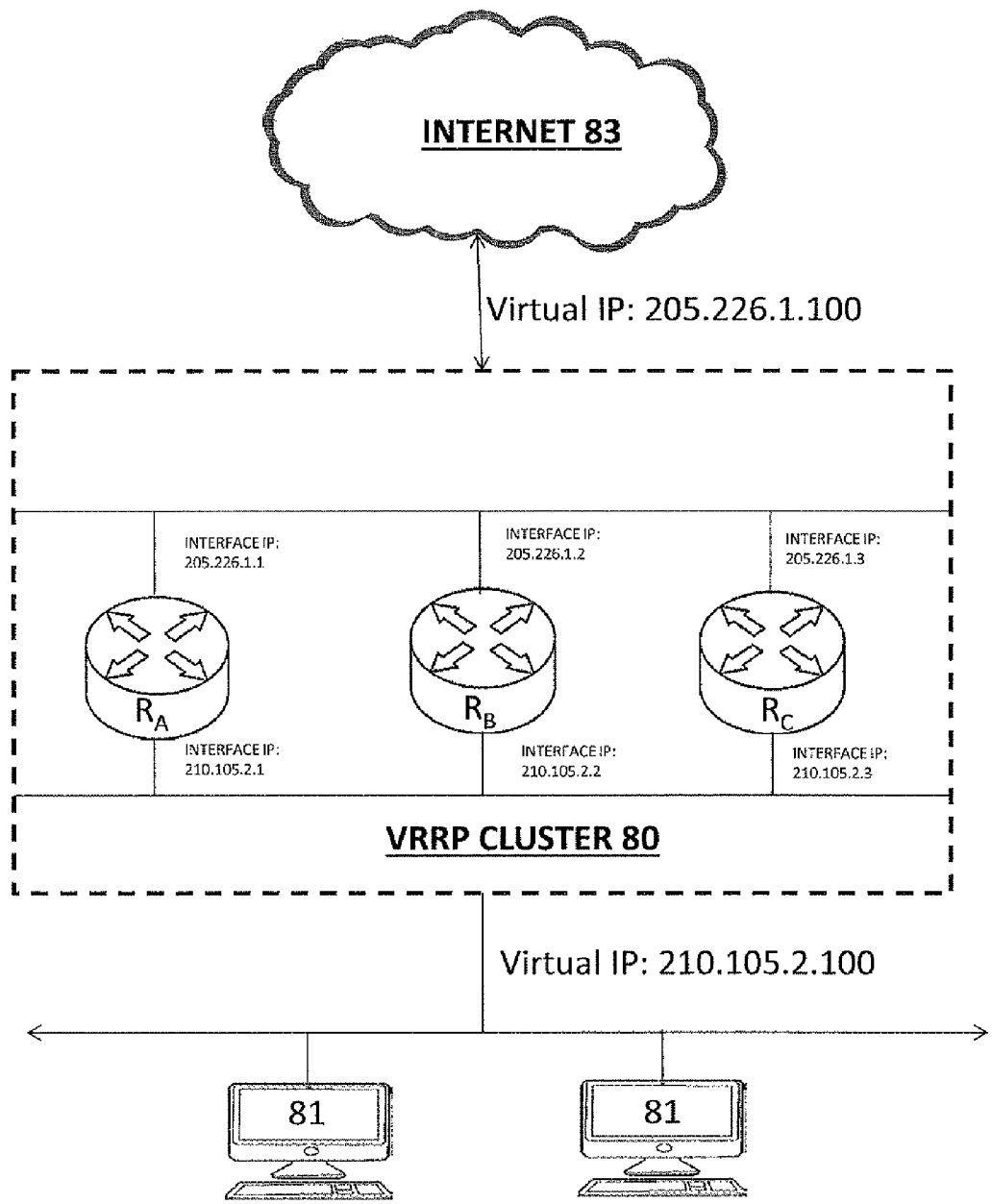
FIG. 1 is an illustration of a typical VRRP implementation.

Referring now to the drawings, FIG. 1 illustrates a typical VRRP implementation. Routers $R_A$, $R_B$ and $R_C$ belong to a VRRP cluster 80, and are jointly responsible for routing traffic between nodes 81 and the Internet 83. Amongst $R_A$, $R_B$ and $R_C$, one router acts as the master while the other two standby as backup. Together, $R_A$, $R_B$ and $R_C$ make up a virtual router, or cluster of routers, with a virtual IP address which is known to nodes 81. The virtual IP address is not tied to any specific router in the cluster and remains the same after a failover event, thus nodes 81 on the network can continue communicating with the same virtual IP address, even though the physical router it is communicating with may be different.

Figure 2:
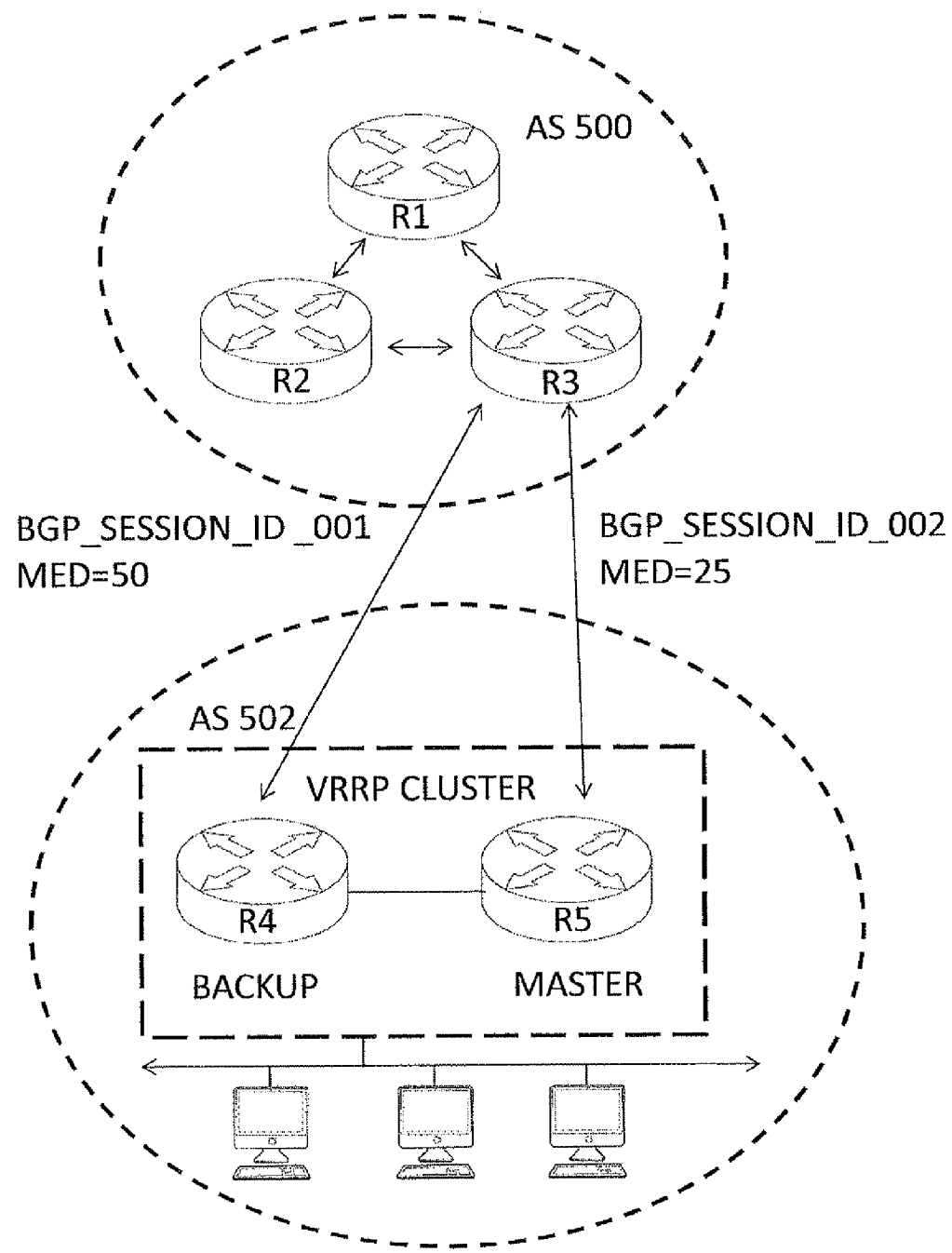
FIG. 2 illustrates an example of a network where BGP routers are also configured for VRRP.

FIG. 2 illustrates an example of a network where BGP routers are also configured for VRRP where the method of the present invention may be implemented. R1, R2, and R3 are BGP routers in an Autonomous System AS 500. R4 and R5 are BGP routers in a neighboring Autonomous System AS 502. R4 and R5 also belong to a VRRP cluster. R4 and R5 each advertise route information to R3 in BGP sessions BGP_SESSION_ID_001 and BGP_SESSION_ID_002 respectively. R3 uses the route information advertised by R4 and R5 to determine the best route to forward traffic from R1 and R2 to destinations in AS 502. In BGP_SESSION_ID_001, R4 advertises to R3 MED=50. In BGP_SESSION_ID_002, R5 advertises to R3 MED=25. Because the route advertised by R5 is less expensive than that advertised by R4, R3 will most likely choose R5 to forward traffic from R1 and R2 to destinations in AS 502.

By default, if R5 advertised MED=100, R3 would most likely choose R4 as the is preferred route even though R5 is acting as master virtual router in the VRRP cluster. However according to the method of the present invention the network administrator responsible for AS 502 may configure R4 and R5 so that at any given time the router which is the primary forwarder of traffic from AS 500 (as determined by BGP) is also the master virtual router (as determined by VRRP). Further, according to the method of the present invention, a failure in either a BGP session or a VRRP state will cause the backup router to assume both responsibilities (i.e. primary BGP router and VRRP master virtual router). This way, it can be guaranteed that a router which has a problem is not responsible for assuming a primary role in either capacity.

FIGS. 3-6 illustrate, using flowcharts, a preferred embodiment for configuring a router using the method of synchronized BGP and VRRP failover of the present invention. In FIGS. 3-6 it is assumed that the router being configured is desired to be the primary BGP router, and master virtual router on each interface configured for VRRP.

Figure 3:
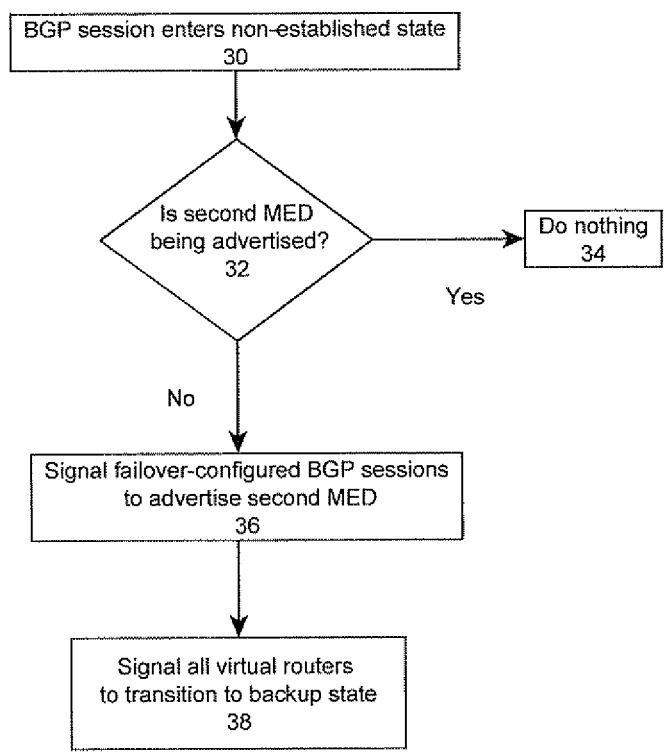
FIG. 3 is a flow chart illustrating the method according to a preferred embodiment when a BGP session enters a non-'established' state.

In FIG. 3, the router receives a signal which includes an indication that a previously 'established' session entered a non-'established' state 30. The router is configured to take the following actions: first check whether the second MED is already being advertised 32. If it is, the router is already not acting as primary, probably due to a prior failure event, so there is nothing further to do 34. On the other hand, if the second MED is not currently being advertised, then this is the first failure and a failover to the backup router is required. All failover-configured sessions are signaled to advertise the second MED 36, and all virtual routers are signaled to transition to 'backup' state 38.

Figure 4:
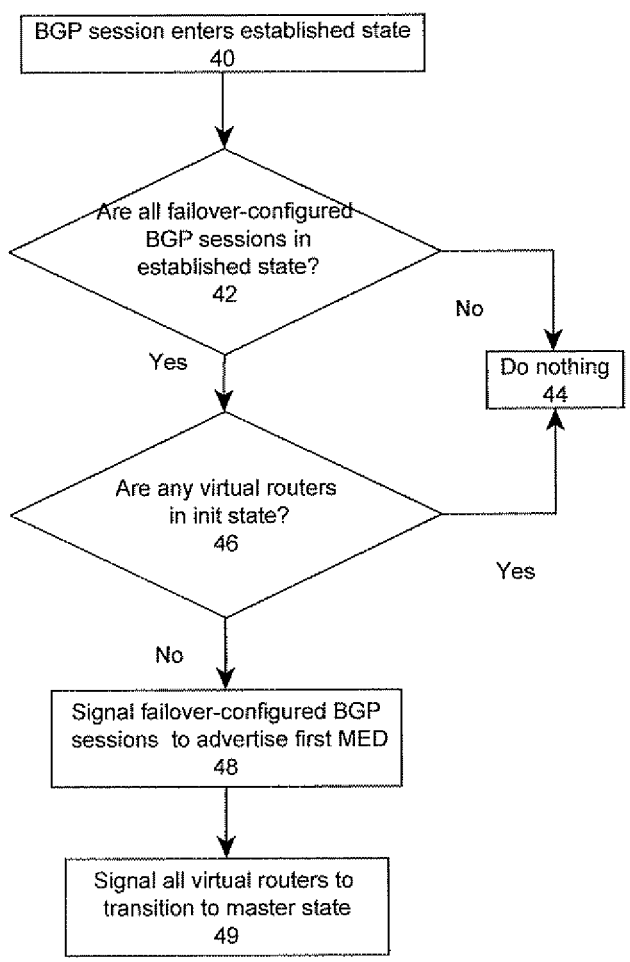
FIG. 4 is a flow chart illustrating the method according to a preferred embodiment when a BGP session enters an 'established' state.

In FIG. 4, the router, which is now in failover mode receives a signal which includes an indication that a previously non-'established' session entered an 'established' state 40. The router is configured to take the following actions: first check that all BGP sessions are in 'established' state 42. If at least one session is still non-'established', do nothing 44, since the router is not ready to resuming the role of primary. If all BOP sessions are 'established', next check whether any virtual routers are in 'init' state 46. If any virtual router is in 'init' state, do nothing 44, since there may be another failure which should prevent the router from resuming its role as primary. If no virtual routers are in 'init' state (i.e. all are in 'backup' state), the router can resume being the primary BGP router and master virtual router. Signal all failover-configured sessions to advertise the first MED 48 and signal all virtual routers to transition to 'master' state 49.

Figure 5:
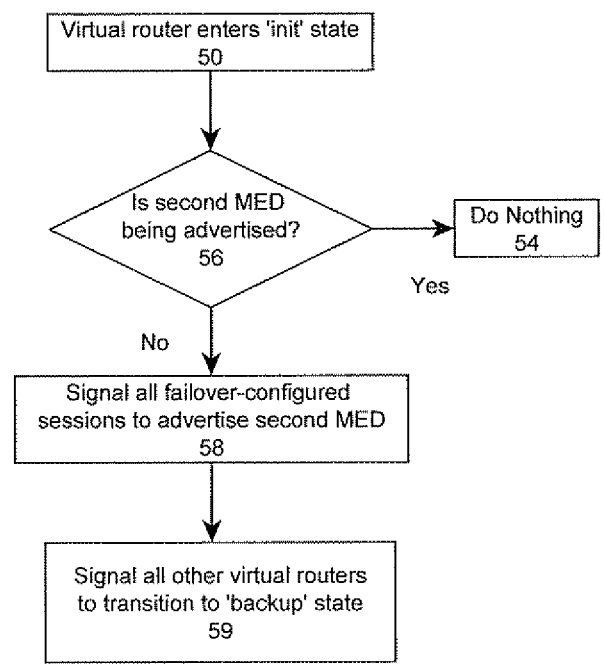
FIG. 5 is a flow chart illustrating the method according to a preferred embodiment when a virtual router enters an 'init' state.

In FIG. 5, the router receives a signal which includes an indication that a virtual router entered an 'init' state 50, which could be either because it was just added to the system or it could be indicative of a failure. If this router is still acting as primary BGP router, failover is required. The router is configured to perform the following actions: First check if the second MED is being advertised 52. If it is, the router has already failed-over, (e.g. due to a prior failure), so nothing further needs to be done 54. If not, the router needs to failover. Signal all failure-configured sessions to advertise the second MED 58 and signal all other virtual routers to transition to 'backup' 59. This transition continues to FIG. 6, 'init' to 'backup'.

Figure 6:
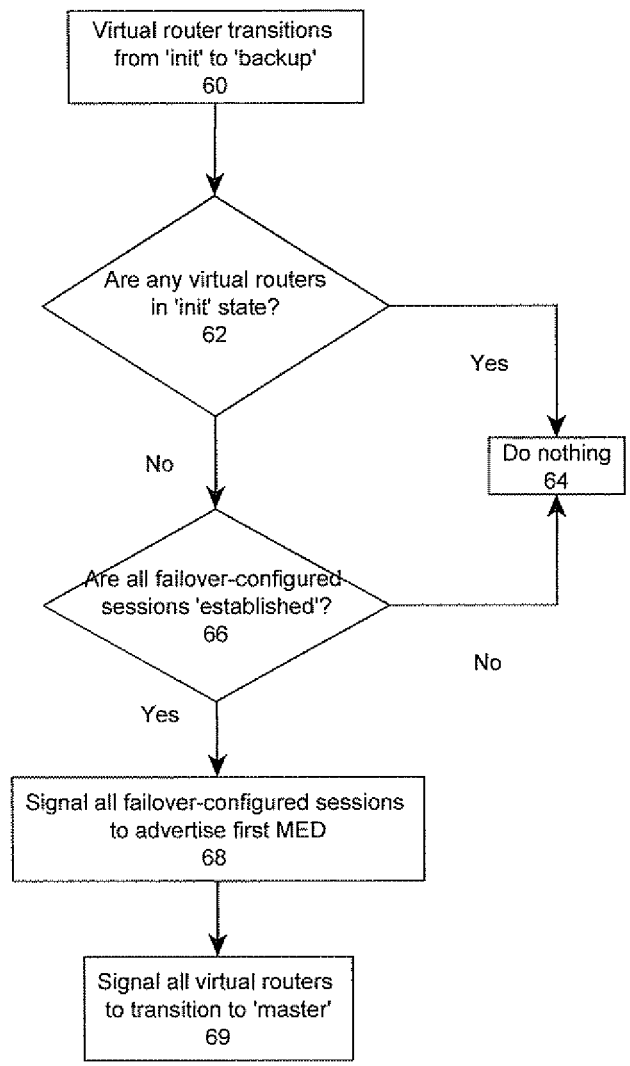
FIG. 6 is a flow chart illustrating the method according to a preferred embodiment when a virtual router transitions from an 'init' state to 'backup' state.

In FIG. 6, the router, which is now in failover mode (i.e. no longer acting as primary BGP router or 'master' virtual router), receives a signal which includes an indication that a virtual router has transitioned from 'init' to 'backup' 60. The router is configured to take the following actions: First, check whether any virtual routers are in 'init state 62. If so, there must be another unresolved failure so nothing further needs to be done 64. If no virtual routers are in 'init state, next check whether all failover-configured sessions are in an 'established' state 66. If any session is not 'established' there must be another unresolved failure so nothing further needs to be done 64. If all sessions are 'established', the router is ready to resume its role as primary (BGP) and master (VRRP). Signal all failover-configured sessions to advertise the first MED 68, and signal all virtual routers to transition to 'master' 69.

Figure 7:
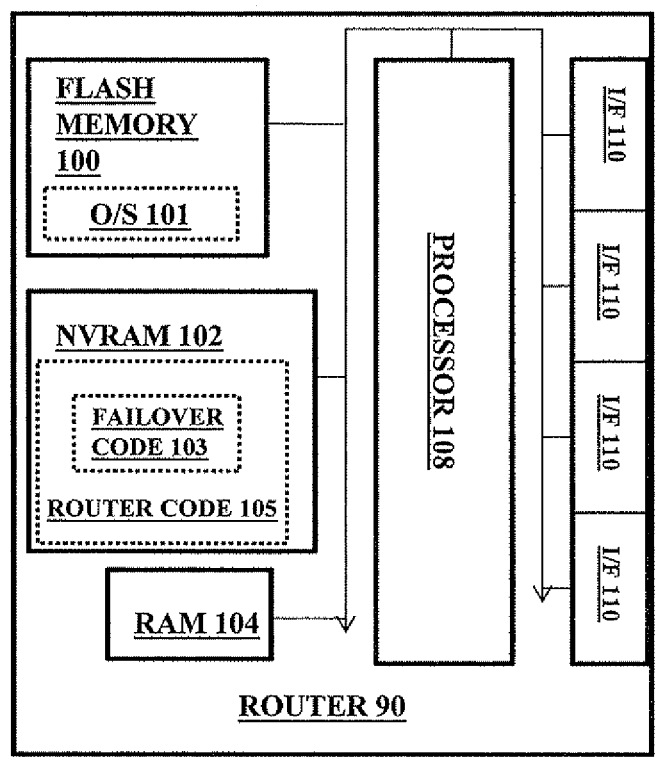
FIG. 7 is a high level block diagram of a router with a computer-readable storage medium containing the router code of the present invention.

FIG. 7 is a high level block diagram of a router containing computer-readable code that when executed, causes the router to automatically failover a BGP session to a backup router and, if configured for VRRP, also failover the virtual router to a 'backup' state. Router 90 contains a flash memory 100, a non-volatile random access memory (NVRAM) 102, a random access memory (RAM) 104, a processor 108, and one or more interfaces 110. On startup, the O/S 101 is loaded from flash memory 100 by processor 108. Under the directive of O/S 101, processor 108 then loads router code 105 which includes failover code 103 from NVRAM 102 and into RAM 104. Processor 108 loads the computer-readable instructions contained in failover code 103 causing the router to automatically failover one or more BGP sessions between interfaces 110 of router 90 and peers to a backup router. In addition, if any interfaces 110 of router 90 are configured as VRRP virtual routers, failover code 103 also causes those virtual routers to failover to backup VRRP virtual routers. Note that router 90 in FIG. 7 is a conventional router which is configured for BGP, and optionally also VRRP, similar to routers R4 and R5 in FIG. 2. Also, although FIG. 7 shows four interfaces, the number of interfaces is not limited to four and in most cases the number of interfaces will in fact be many more.

Figure 8:
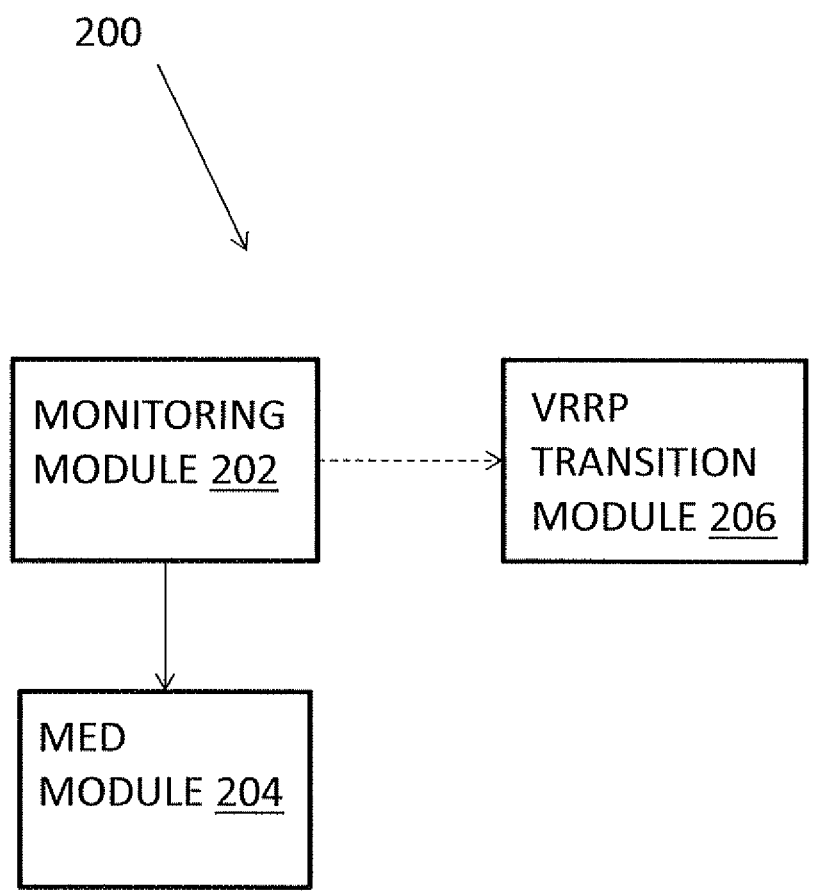
FIG. 8 is a high level block diagram of a network device according to the present invention.

FIG. 8 is a hardware embodiment of a network device 200 of the present invention. Network device 200, which can be for example a router, includes a monitoring module 202 and a MED module 204. Monitoring module 202 is configured to monitor the state of each BGP session on the device 200. MED module 204 is configured to advertise to a peer, for a session, either a first MED or a second MED which is greater than the first MED and also greater than the MED advertised by a backup network device to the peer. Initially, MED module 204 advertises the first MED. Subsequently, if MED module 204 receives a signal from monitoring module 202 that a session transitioned from an 'established' state to a non-'established' state, and the second MED is not currently being advertised to any peer, MED module 204 advertises the second MED to its peers. Subsequently, if MED module 204 receives a signal from monitoring module 202 that a session transitioned from a non-'established' state to an 'established' state, and that all sessions are in an 'established' state, MED module 204 again advertises the first MED.

Optionally, as indicated by the dotted connecting line in FIG. 8, network device 200 may also include a VRRP transition module 206 and monitoring module 202 may be configured to also monitor the state of each VRRP virtual router on the device 200. In that case, initially when MED module 204 advertises the first MED, VRRP transition module 206 transitions each virtual router to a 'master' state. Subsequently, when MED module 204 receives a signal from monitoring module 202 that either: a session transitioned from an 'established' state to a non-'established' state, or that a virtual router transitioned into an 'init' state, and the second MED is not currently being advertised to any peer, MED module 204 advertises the second MED to its peers and VRRP transition module 206 transitions each virtual router to 'backup' state. Subsequently, if MED module 204 receives a signal from monitoring module 202 that either: a session transitioned from a non-'established' state to an 'established' state, or that a virtual router transitioned from an 'init' state to a 'backup' state, and that all sessions are in an 'established' state and no virtual routers are in an 'init' state, MED module 204 again advertises the first MED and VRRP transition module 206 transitions each virtual router into a 'master' state. Note that network device 200 is similar to a conventional router, such as routers R4 and R5 in FIG. 2, but with the additional functionality that advertising module 204 is hardware configured to advertise either a first MED or a second MED according to the signals received from monitoring module 202 and associated conditions.

While the invention has been described with respect to a limited number of embodiments, it will be appreciated that many variations, modifications and other applications of the invention may be made. Therefore, the invention as recited in the claims that follow is not limited to the embodiments described herein.

What is claimed is:

1. A method for automatic failover of route selection in a network by a Border Gateway Protocol (BGP) peer in a first autonomous system, from a route learned through a session with a first network device to a route learned through a session with a second network device, said first network device and said second network device local to each other in a second autonomous system, said second autonomous system being separate from said first autonomous system, comprising: by said first network device:
    initially advertising, to said BGP peer, a first Multi-Exit Discriminator (MED); and, subsequent to said initial advertising of said first MED to said BGP peer:
        upon receiving a first signal including an indication of a session transitioning out of an 'established' state, and upon a first set of network conditions outside of said first autonomous system being met, said first set of network conditions including a second MED not being currently advertised: advertising to said BGP peer said second MED, said second MED greater than said first MED; and,
        subsequent to said advertising of said second MED to said BGP peer, and upon receiving a second signal and upon a second set of network conditions outside of said first autonomous system being met: again advertising said first MED to said BGP peer; wherein said second signal includes an indication that a session has transitioned into an 'established' state, and said second set of network conditions includes: all sessions are in an 'established' state.

2. The method of claim 1, wherein said second MED is greater than a MED advertised by the second network device to said BGP peer.

3. The method of claim 1, further comprising:
    if one or more Virtual Router Redundancy Protocol (VRRP) virtual routers are configured on one or more interfaces of the first network device and the second network device, then, by the first network device: (i) when initially advertising said first MED: also signaling each of said one or more virtual routers to transition to a 'master' state, and (ii) subsequently when advertising said second MED: also signaling each of said one or more virtual routers to transition to a 'backup' state.

4. The method of claim 3, wherein said first signal includes an indication that either: (i) a session transitioned out of an 'established' state, or (ii) a virtual router transitioned into an 'init' state, and wherein said first set of network conditions is: said second MED is not currently being advertised to a BGP peer.

5. The method of claim 3, further comprising:
    subsequent to said advertising of said second MED to said BGP peer, and upon receiving a second signal and upon a second set of network conditions outside of said first autonomous system being met: (i) again advertising said first MED to said BGP peer, and (ii) signaling each of said one or more virtual routers to transition to a 'master' state.

6. The method of claim 5, wherein said second signal includes an indication that either: (i) a session transitioned into an 'established' state, or (ii) a virtual router transitioned into a 'backup' state, and wherein said second set of network conditions outside of said first autonomous system includes: each session is in an 'established' state, and none of said one or more virtual routers is in an 'init' state.

7. The method of claim 1, wherein said conditions outside of said first autonomous system being met include conditions in said second autonomous system being met.

8. A non-transitory computer-readable storage medium having non-transient computer-readable code embodied on the non-transitory computer-readable storage medium, the non-transitory computer-readable code for causing route selection in a network by a Border Gateway Protocol (BGP) peer in a first autonomous system to failover from a route received in a session with a first router to a route received in a session with a second router, the first router and the second router being local to each other in a second autonomous system separate from said first autonomous system, the computer-readable code comprising a set of instructions that, when executed on the first router, causes the first router to:
    initially advertise, to said BGP peer, a first Multi-Exit Discriminator (MED); and,
    subsequent to said initial advertising of said first MED to said BGP peer:
        upon receiving a first signal including an indication of a session transitioning out of an 'established' state, and upon a first set of network conditions outside of said first autonomous system being met, said first set of network conditions including a second MED not being currently advertised: advertising to said BGP peer said second MED, said second MED greater than said first MED; and, subsequent to said advertising of said second MED to said BGP peer, and upon receiving a second signal and upon a second set of network conditions outside of said first autonomous system being met: again advertising said first MED to said BGP peer;

wherein said second signal includes an indication that a session has transitioned into an 'established' state, and said second set of network conditions includes: all sessions are in an 'established' state.

9. The non-transitory computer-readable storage medium of claim 8, wherein said second MED is greater a MED advertised by the second router to said BGP peer.

10. The non-transitory computer-readable storage medium of claim 8, further comprising instructions that, when executed on the first router, causes the first router to:
if an interface of the first and second routers is configured as a Virtual Router Redundancy Protocol (VRRP) virtual router then: (i) when initially advertising said first MED: also signal said virtual router to transition to a 'master' state, and (ii) subsequently when advertising said second MED: also signal said virtual router to transition to a 'backup' state.

11. The non-transitory computer-readable storage medium of claim 10, wherein said first signal includes an indication that either: (i) a session transitioned out of an 'established' state, or (ii) a virtual router transitioned into an 'init' state, and wherein said first set of network conditions includes: said second MED is not currently being advertised.

12. The non-transitory computer-readable storage medium of claim 10, further comprising instructions that, when executed on the first router, causes the first router to:
subsequent to said advertising of said second MED to said BGP peer, and upon receiving a second signal and upon a second set of network conditions outside of said first autonomous system being met: (i) again advertise said first MED to said BGP peer, and (ii) signal said virtual router to transition to a 'master' state.

13. The non-transitory computer-readable storage medium of claim 12, wherein said second signal includes an indication that either: (i) a session transitioned into an 'established' state, or (ii) a virtual router transitioned into a 'backup' state, and wherein said second set of network conditions includes: each session is in an 'established' state, and no virtual router is in an 'init' state.

14. A network device comprising:
monitoring circuitry for monitoring a respective state in a network of each of at least one Border Gateway Protocol (BGP) session; and,
Multi-Exit Discriminator (MED) circuitry in a first autonomous system, that:
(i) initially advertises to a peer in a second autonomous system separate from the first autonomous system, a first MED;
(ii) upon receipt of a first signal from said monitoring circuitry, said first signal including an indication of a session transitioning out of an 'established' state, and if a first set of network conditions outside of said first autonomous system is met, said first set of network conditions including a second MED not being currently advertised: advertises to said peer a second MED; and,
(iii) subsequent to said advertising of said second MED to said peer, and upon receipt of a second signal from said monitoring circuitry, if a second set of network conditions outside of said first autonomous system is met: again advertises to said peer said first MED, wherein said second signal includes an indication that a session has transitioned into an 'established' state, and said second set of network conditions includes: all sessions are in an 'established' state; and, wherein said second MED is greater than said first MED.

15. The network device of claim 14, wherein said second MED is greater than a MED advertised by a backup network device to said peer.

16. The network device of claim 14, wherein said monitoring circuitry also monitors a respective state of each of at least one Virtual Router Redundancy Protocol (VRRP) virtual router, and further comprising:
VRRP transition circuitry for transitioning the state of a virtual router, wherein when said MED circuitry advertises said first MED, said VRRP transition circuitry transitions each of the at least one virtual routers to a 'master' state, and wherein when said MED circuitry advertises said second MED, said VRRP transition circuitry transitions each of the at least one virtual routers to a 'backup' state.

17. The network device of claim 16, wherein said first signal includes an indication that either: (i) a session transitioned out of an 'established' state, or (ii) a virtual router transitioned into an 'init' state; and wherein said first set of network conditions includes: said second MED is not currently being advertised.

18. The network device of claim 16, wherein said second signal includes an indication that either: (i) a session transitioned into an 'established' state, or (ii) a virtual router transitioned into a 'backup' state, and wherein said second set of network conditions outside of said second autonomous system includes: all sessions are in an 'established' state, and no virtual routers are in an 'init' state.

* * * * *